United States Patent [19]
Badesha et al.
[11] Patent Number: 4,855,203
[45] Date of Patent: Aug. 8, 1989

[54] IMAGING MEMBERS WITH PHOTOGENERATING COMPOSITIONS OBTAINED BY SOLUTION PROCESSES

[75] Inventors: Santokh S. Badesha, Pittsford; Geoffrey M. T. Foley; Damodar M. Pai, both of Fairport, all of N.Y.; Richard H. Zallen, Blacksburg, Va.; Michael L. Slade, Rochester; Martin A. Abkowitz, Webster, both of N.Y.

[73] Assignee: Xerox Corporation, Stamford, Conn.

[21] Appl. No.: 92,266

[22] Filed: Aug. 31, 1987

[51] Int. Cl.$^4$ ...................... C01B 19/02; C22C 28/00; G03G 5/082; G03G 5/14

[52] U.S. Cl. ........................................ 430/59; 430/58; 430/84; 430/85; 430/86; 430/130; 430/133; 430/135; 430/126; 420/579; 423/510

[58] Field of Search ...................... 430/58, 59, 84, 85, 430/86, 130, 133, 135; 423/508, 509, 510; 420/579

[56] References Cited

U.S. PATENT DOCUMENTS

| | | | |
|---|---|---|---|
| 3,148,084 | 9/1964 | Hill et al. . | |
| 4,097,273 | 6/1978 | Gunther | 430/63 X |
| 4,115,115 | 9/1978 | Marsh . | |
| 4,421,838 | 12/1983 | Takeda et al. | 430/58 |
| 4,481,273 | 11/1984 | Katagiri et al. | 430/59 |
| 4,663,141 | 5/1987 | Sovoda et al. | 423/508 X |

*Primary Examiner*—Roland E. Martin
*Attorney, Agent, or Firm*—E. O. Palazzo

[57] ABSTRACT

A layered photoresponsive imaging member comprised of a supporting substrate; an amorphous photoconductive layer and a hole transport layer dispersed in a resinous binder, which layer is formulated from a solution mixture; and wherein the photoconductive layer is prepared by a process which comprises dissolving an inorganic photoconductive component in a solvent, removing the suspended particles therefrom, depositing the resulting solution on the supporting substrate, and subsequently heating the aforementioned member.

36 Claims, No Drawings

IMAGING MEMBERS WITH PHOTOGENERATING COMPOSITIONS OBTAINED BY SOLUTION PROCESSES

BACKGROUND OF THE INVENTION

This invention is generally directed to processes for the preparation of photogenerating compositions useful in layered photoresponsive imaging members. More specifically, the present invention is directed to processes for the preparation of amorphous inorganic photogenerating thin films by a simple and economical solution method. In one embodiment of the present invention, the process comprises dissolving the inorganic photogenerating or photoconductive material, such as an arsenic selenium alloy, thereafter formulating a photogenerating layer therefrom by deposition, for example, on a suitable substrate, and subsequently heating the aforementioned device. Subsequently, a charge transport layer is deposited thereon by a solution process to enable a layered imaging member useful in electrophotographic imaging systems. In another embodiment of the present invention, the charge transport layer can be situated between the supporting substrate and the photogenerator or photoconductive layer.

The formation and development of electrostatic latent images on the imaging surfaces of photoconductive materials by electrostatic means is well known, one such method involving the formation of an electrostatic latent image on the surface of a photoreceptor. A photoreceptor can comprise a conductive substrate containing on its surface a layer of photoconductive insulating material, and in many instances there can be selected a thin barrier layer between the substrate and the photoconductive layer to prevent charge injection from the substrate into the photoconductive layer upon charging of its surface.

Numerous different photoconductive members for use in xerography are known including amorphous selenium and amorphous selenium alloys. There are also known photoreceptor materials comprised of other inorganic or organic materials wherein the charge carrier generation and charge carrier transport functions are accomplished by discrete contiguous layers. Additionally, photoreceptor materials are disclosed in the prior art, which include an overcoating layer of an electrically insulating polymeric material, and in conjunction with this overcoated type photoreceptor there have been proposed a number of imaging methods.

Recently, there have been developed other layered photoresponsive devices including those comprised of generating layers and transport layers as disclosed in U.S. Pat. No. 4,265,990, the disclosure of which is totally incorporated herein by reference. Examples of photogenerating layers disclosed in these patents include trigonal selenium and vanadyl phthalocyanine, while examples of the transport layer that may be employed are comprised of certain aryl amines. This member is utilized in an electrophotographic copying method by, for example, initially charging the member with an electrostatic charge of a first polarity and imagewise exposing to form an electrostatic latent image which can be subsequently developed to form a visible image. Prior to each succeeding imaging cycle, the imaging member can be charged with an electrostatic charge of a second opposite polarity. Photogenerating pigments disclosed in this patent are usually prepared by complex vacuum evaporation methods. Also, there is disclosed in U.S. Pat. Nos. 4,232,102 and 4,233,383 the use of sodium carbonate doped and barium carbonate doped photoresponsive imaging members containing trigonal selenium, which are usually prepared by vacuum evaporation methods. Other representative patents disclosing layered photoresponsive devices, and the preparation of photogenerating compositions by vacuum evaporation include U.S. Pat. Nos. 4,115,116; 4,047,949 and 4,081,274.

Furthermore, there is illustrated in U.S. Pat. No. 3,148,084 processes for the formulation of photoconductive films wherein as one of the steps thereof there is sprayed onto a substrate a solution containing a soluble compound of at least one of the elements from Group VIA, and a soluble salt selected from other Groups such as 1A. Examples include selenium and sulfur with soluble salts of cadmium, copper, arsenic, and the like, reference columns 5 and 6. In contrast with the invention of the present application, soluble salts are not selected thereby enabling amorphous components, rather than crystalline materials; and further a high temperature spraying step is avoided with the process of the present invention. Moreover, with the process of the U.S. Pat. No. 3,148,084, the resulting products will most likely be contaminated because of the presence of the salts selected for the processes disclosed, which contamination would adversely affect the electrical characteristics of any resulting layered photoconductive imaging member prepared. The U.S. Pat. No. 3,148,084 is also of interest in that it discloses several processes for the preparation of films including evaporation processes, reference columns 1 and 2. Also of interest are U.S. Pat. Nos. 4,115,115 which describes processes for the formation of a layer of trigonal selenium dispersed in a polymer matrix by forming a solution of dibenzoyl peroxide, an organo selenium compound which interacts therewith, and a matrix polymer, thereafter applying the solution to a substrate, and accomplishing the other steps as detailed in the Abstract of the Disclosure, for example; and U.S. Pat. No. 4,421,838 which discloses the preparation of selenium in an insulating polymer by the reduction of an inorganic compound in the presence of the polymer. Patents of background interest include U.S. Pat. Nos. 2,898,240; 4,050,935; 4,053,311 and 4,481,273.

Although processes for the preparation of photogenerating materials are known, there remains a need for new processes that are simple and economical. There is also a need for processes for the preparation of photogenerating or photoconductive compounds wherein complex evaporation methods are avoided. Furthermore, there is a need for solution processes wherein amorphous photoconductive components are obtained in high yields. There is also a need for processes wherein imaging members can be prepared in a simple manner by solution methods. Moreover, there is a need for the preparation of photogenerating pigments by solution processes wherein there is avoided the spraying of the solution onto heated substrates. Further, there is a need for the low temperature preparation of thin amorphous photogenerating layers by solution processes. Also, there is a need for processes which provide layered electrophotographic imaging devices free of contaminations which affect the electricals.

SUMMARY OF THE INVENTION

It is therefore an object of the present invention to provide processes for the preparation of photogenerating compositions with the above noted advantages.

It is yet another object of the present invention to provide solution processes for the preparation of thin photogenerating layers that can be selected for photoconductive imaging members.

Further, in another object of the present invention there are provided processes for the preparation of thin photogenerating layers, such as selenium alloys wherein complex reactions such as decompositions at high temperatures are avoided.

Another object of the present invention resides in solution processes where the photogenerating materials desired are dissolved, and the salts thereof are not utilized.

In yet another object of the present invention there are provided solution processes that enable the formation of thin amorphous photogenerating layers of high purity.

It is yet still another object of the present invention to provide solution processes for the preparation of photogenerating layers that can be selected for layered imaging members with charge transport layers therein that are formed by solution methods.

In a further object of the present invention there is provided an improved layered photoresponsive imaging member with a photogenerating layer prepared by the process described herein situated between a supporting substrate, and a hole transport layer comprised of, for example, polysilanes or aryl amines disclosed hereinafter.

In yet another object of the present invention there are provided photoresponsive imaging members comprised of a hole transporting composition layer situated between a supporting substrate and a photogenerating layer wherein these layers are formed by solution processes.

Additionally, in another object of the present invention there are provided layered photoresponsive imaging members wherein the photogenerating and transport layers are solution coated thereby avoiding residual impurities which adversely affect the electrical characteristics of the member.

These and other objects of the present invention are accomplished by the preparation of thin amorphous photogenerating or photoconductive layers by solution processes. More specifically, in one embodiment of the present invention there is provided a process for the preparation of amorphous photogenerators or photoconductive components, which comprises providing a chalcogen or a chalcogenide alloy, forming a solution thereof, separating the suspended particles therefrom, depositing the solution on a supporting substrate, and subsequently heating the aforementioned member. Thereafter, a charge transport layer can be coated thereon from a solution enabling a layered photoresponsive imaging member. Thus, for example, a photogenerating layer can be prepared by initially dissolving an inorganic photoconductive material, such as amorphous selenium or selenium arsenic alloys, in a suitable substance, such as an amine, by stirring at room or elevated temperatures. Thereafter, the solution is filtered for the purpose of removing suspended particles, and homogeneous films are formulated therefrom by spin casting at, for example, 600 RPM, which films are then deposited in a conductive supporting substrate, such as aluminum. Followed by heating the resulting films at elevated temperatures of, for example, from about 60° C. to about 120° C. and cooling, there results a photogenerating layer deposited on the substrate. A hole transport layer is then deposited on the photogenerating layer by the solution coating of an aryl amine as illustrated in U.S. Pat. No. 4,265,990, the disclosure of which is totally incorporated herein by reference, from, for example, a methylene chloride mixture. There results a layered imaging member that can be selected for electrophotographic imaging processes.

More specifically, with further respect to the process of the present invention there is initially dissolved the chalcogenide or chalcogen components inclusive of amorphous selenium and amorphous selenium alloys, particularly selenium tellurium, from about 0.1 to 70 percent by weight of tellurium; selenium arsenic, from about 0.1 to about 40 percent by weight; a selenium tellurium arsenic, from about 0.1 to 5 percent by weight of arsenic, from about 0.5 to about 10 percent of tellurium, and the balance selenium in appropriate solvents. Examples of solvents selected to enable solubilization include primary, secondary amines, or mixtures thereof such as those of the formula $RNH_2$ and $NH_2—R—NH_2$ wherein R is an alkyl or aryl substituent. This solution is generally accomplished by stirring and warming the aforementioned mixture to, for example, from 50 to 80° C., and preferably 60° C. Specifically, with respect to the preparation of arsenic triselenide there is first prepared a 30 percent solution of selenium followed by stirring and warming at 60° C., which solution includes therein 100 milliliters of ethylene diamine. Thereafter, filtration is accomplished to remove any suspended particles. Subsequently, the resulting solution is deposited on a supporting substrate by various known techniques, including spin casting, spray coating, and draw bar coating; and thereafter the aforementioned member is heated from, for example, about 60 to about 120° C. primarily for the purpose of removing the solvent selected. Spin casting at between 200 revolutions per minute to 2,000 revolutions per minute is preferred. Thereafter, there result films of a thickness of from about 0.05 micron to about 0.5 micron, which film is dried at a temperature of from about 50° C. to about 90° C. for the primary purpose of eliminating any residual solvent.

Another embodiment of the present invention is directed to a process for the formation of an amorphous photoconductive component which comprises dissolving a chalcogenide or chalcogenide alloy in a solvent, thereafter removing the suspended particles therefrom, depositing the resulting solution on a supporting substrate, and subsequently heating the aforementioned formed device thereby enabling removal of the solvent.

Subsequently, an imaging member is prepared by depositing on the aforementioned photogenerating layer a charge transport layer by known solution coating processes. This layer is of a thickness of from about 20 to about 50 microns, and preferably from about 20 to about 35 microns. Thereafter, the formulated imaging member obtained can be dried in an oven, for example, at 100° C. for about half an hour to eliminate any residual solvents. As charge transport components there can be selected the aryl amines as illustrated in U.S. Pat. No. 4,265,990, the disclosure of which is totally incorporated herein by reference; polysilylenes, reference U.S. Pat. No. 4,618,551, the disclosure of which is totally incorporated herein by reference; and other similar components. The aforementioned charge transport materials are generally dispersed in inactive resinous binders inclusive of polycarbonates.

Examples of photoconductive compounds that may be selected for the process of the present invention include amorphous selenium, amorphous selenium alloys, inclusive of selenium arsenic, selenium antimony, selenium tellurium, and the like; doped amorphous selenium substances, doped amorphous selenium alloys, wherein the dopant is a halogen present in an amount of from about 1 to about 1,000 parts per million; and the like.

In a specific embodiment, the present invention is directed to an improved photoresponsive imaging member comprised of a supporting substrate, a photogenerating layer comprised of amorphous inorganic photoconductive pigments prepared by the solution process described herein optionally dispersed in an inactive resinous binder, and in contact therewith a hole transporting layer comprised of, for example, polysilylenes as illustrated in U.S. Pat. No. 4,618,551, the disclosure of which has been totally incorporated herein by reference, and aryl amines dispersed in inactive resinous binder composition.

Therefore, a specific photoresponsive imaging member of the present invention is comprised of a supporting substrate, an amorphous charge carrier photogenerating layer of a selenium arsenic alloy, which layer is prepared by the solution process illustrated herein, optionally dispersed in an inactive resinous binder composition, and a hole transport layer comprised of a polysilylene dispersed in an inactive resinous binder. In an alternative embodiment, the hole transporting layer can be situated between the supporting substrate and the photogenerating layer. Another photoresponsive imaging member of the present invention is comprised of a conductive supporting substrate of aluminized Mylar, an amorphous charge carrier photogenerating layer of a selenium arsenic alloy with about 98 percent by weight of selenium dispersed in a polyvinyl carbazole resinous binder, and a hole transport layer comprised of a poly(-methylphenyl silylene) of a weight average molecular weight of greater than 50,000 dispersed in a polycarbonate resinous binder.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as Mylar a commercially available polymer; a layer of an organic or inorganic material having a semiconductive surface layer such as indium tin oxide, or aluminum arranged thereon; or a conductive material inclusive of aluminum, chromium, nickel, brass or the like. The substrate may be flexible or rigid and may have a number of many different configurations, such as, for example a plate, a cylindrical drum, a scroll, an endless flexible belt and the like. Preferably, the substrate is in the form of a seamless flexible belt. In some situations, it may be desirable to coat on the back of the substrate, particularly when the substrate is a flexible organic polymeric material, an anti-curl layer, such as for example polycarbonate materials commercially available as Makrolon.

The thickness of the substrate layer depends on many factors, including economical considerations, thus this layer may be of substantial thickness, for example over 2,500 microns; or of minimum thickness providing there are no adverse effects on the system. In one preferred embodiment, the thickness of this layer ranges from about 75 microns to about 250 microns.

With further regard to the imaging members of the present invention, the photogenerator layer is preferably comprised of 100 percent of the amorphous pigments prepared by the solution process disclosed herein. These pigments can be dispersed in resinous binders. Generally, the thickness of the photogenerator layer depends on a number of factors including the thicknesses of the other layers, and the percent mixture of photogenerator material contained in this layer. Accordingly, this layer can be of a thickness of from about 0.05 micron to about 10 microns when the photogenerator composition is present in an amount of from about 5 percent to about 100 percent by volume. Preferably, this layer is of a thickness of from about 0.25 micron to about 1 micron when the photogenerator composition is present in this layer in an amount of 30 percent by volume. In one very specific preferred embodiment, the solution deposited photogenerating layers are of a thickness of from about 0.07 micron to about 0.5 micron. The maximum thickness of this layer is dependent primarily upon factors such as photosensitivity, electrical properties and mechanical considerations.

Illustrative examples of polymeric binder resinous materials that can be selected for the photogenerator pigments include those polymers as disclosed in U.S. Pat. No. 3,121,006, the disclosure of which is totally incorporated herein by reference, polyesters, polyvinyl butyral, Formvar®, polycarbonate resins, polyvinyl carbazole, epoxy resins, phenoxy resins, especially the commercially available poly(hydroxyether) resins, and the like. As adhesives there can be selected various known substances inclusive of polyesters such as those commercially available from E.I. DuPont as 49,000 polyesters. This layer is of a thickness of from about 0.05 micron to 1 micron.

Aryl amines selected for the hole transporting layer, which generally is of a thickness of from about 5 microns to about 50 microns, and preferably of a thickness of from about 10 microns to about 40 microns, include molecules of the following formula:

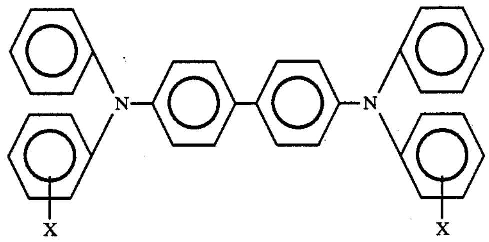

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl. Examples of specific aryl amines are N,N'-diphenyl-N,N'bis(alkylphenyl)-[1,1-biphenyl]-4,4'-diamine wherein alkyl is selected from the group consisting of methyl such as 2-methyl, 3-methyl and 4-methyl, ethyl, propyl, butyl, hexyl, and the like. With chloro substitution, the amine is N,N'-diphenyl-N,N'-bis(halo phenyl)-[1,1'-biphenyl]-4,4'-diamine wherein halo is 2-chloro, 3-chloro- or 4-chloro. Also, electron transport layers, such as those illustrated in U.S. Pat. No. 4,609,602, the disclosure of which is totally incorporated herein by reference, may be selected as a substituent in the aforementioned hole transport composition.

Examples of the highly insulating and transparent inactive binder resinous component for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging with the photoresponsive devices illustrated herein. These methods generally involve the formation of an electrostatic latent image on the imaging member, followed by developing the image with a toner composition, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these examples are intended to be illustrative only. Also, the invention is not intended to be limited to the materials, conditions, or process parameters recited herein, it being noted that all parts and percentages are by weight unless otherwise indicated.

EXAMPLE I

A photogenerating or photoconductive pigment was prepared by dissolving one gram of arsenic triselenide powder in 10 milliliters of ethylene diamine with stirring under an argon atmosphere over a period of two days at room temperature. Thereafter, the resulting solution, which was orange in color, was filtered under an argon atmosphere. Subsequently, there was prepared from the solution a film of a thickness of 0.05 micron by the spin casting thereof at a spinning speed of 900 revolutions per minute on an aluminum substrate two inches by two inches. The film resulting was then dried at 120° C. and aired for 10 minutes for the purpose of removing any excess solvent. There resulted an amorphous arsenic triselenide, about 38 percent of arsenic, film of a thickness of 0.5 micron as determined by Transmission Electron Microscopy.

EXAMPLE II

A photogenerating or photoconductive component was prepared by dissolving two grams of arsenic triselenide in a mixture of 30 milliliters of ethylene diamine and propyl amine (1:1) by stirring and warming to a temperature of 60° C. under an argon atmosphere. There was obtained after 18 hours a clear solution that converted to an orange solution, which solution was then filtered. Spin casting of the filtered solution at 1,000 revolutions per minute in accordance with Example I provided a film of arsenic triselenide, 30 percent arsenic, which was dried at 120° C. for 10 minutes in air. There resulted an arsenic triselenide photoconductive layer with a thickness of 0.04 micron as determined by Transmission Electron Microscopy.

EXAMPLE III

There was prepared an arsenic triselenide photoconductive layer by dissolving 15 grams of arsenic triselenide in 100 milliliters of ethylene diamine by stirring and heating at 55° C. under an argon atmosphere for 30 hours. The solution resulting was then filtered, followed by spin casting thereof at 600 revolutions per minute on an aluminum substrate, reference Example I. There resulted a film of arsenic triselenide, 40 percent arsenic, in a thickness of 0.3 micron, which film was then heated at 120° C. for 10 minutes for the purpose of removing any excess solvent.

EXAMPLE IV

There was prepared a photoconductive layer by dissolving 30 grams of arsenic triselenide in a mixture of ethylene diamine and n-butyl amine (1:1) at 55° C. for 3 days under an argon atmosphere. Thereafter, the suspended particles were filtered and there resulted a clear orange solution which was spin coated at 600 revolutions per minute on an aluminum substrate, reference Example I, two inches by two inches, to result in a film of arsenic triselenide, 40 percent arsenic, in a thickness of 0.4 micron as determined by Transmission Electron Microscopy. Subsequently, the aforementioned film was dried at 120° C. for 10 minutes.

EXAMPLE V

A photoresponsive imaging member was prepared by solution coating on the photogenerating layer obtained from Example IV a charge transport layer comprised of 55 percent by weight of N,N'-diphenyl-N,N'-bis(3-methylphenyl)-1,1'-biphenyl-4,4'-diamine, and 45 percent by weight of a polycarbonate available as Makrolon by a bar coating process. The charge transport layer was of a thickness of about 25 microns while the photogenerating layer had a thickness of 0.3 micron.

EXAMPLE VI

The procedure of Example V was repeated with the exception that there was selected as the charge transport layer a poly(methylphenyl silylene) which was solution coated from a 3 percent solution of the polysilylene in toluene. There resulted a photoresponsive imaging member wherein the thickness of the charge transport poly(methylphenyl silylene) was 17 microns.

The imaging members of Examples V and VI were then evaluated by charging them negatively with a corona to a voltage of about -800. Imagewise exposure can then be accomplished, followed by development of the images with a toner composition comprised of styrene n-butyl methacrylate, 88 percent by weight; carbon black, 10 percent by weight; and 2 percent by weight of cetyl pyridinium chloride. Images of acceptable resolution can be obtained with substantially no background deposits, and the imaging member will possess stable electrical characteristics. In comparison, similar imaging members with the exception that the photogenerating layer of arsenic triselenide is vacuum deposited on the aluminum substrate evidence electrical instability after about 100 imaging cycles.

Other modifications of the present invention will occur to those skilled in the art subsequent to a review of the present application. These modifications, and equivalents thereof are intended to be included within the scope of this invention.

What is claimed is:

1. A layered photoresponsive imaging member comprised of a supporting substrate; an amorphous photoconductive layer and a hole transport layer dispersed in a resinous binder, which hole transport layer is formulated from a solution mixture; and wherein the photoconductive layer is prepared by a process which comprises dissolving an inorganic photoconductive component selected from the group consisting of amorphous selenium and amorphous selenium alloys in a solvent consisting of one or more amines, removing the suspended particles therefrom, depositing the resulting solution on the supporting substrate, and subsequently heating the aforementioned member, wherein the imaging member is free of residual impurities that adversely affect electrical characteristics.

2. An imaging member in accordance with claim 1 wherein the supporting substrate is comprised of a conductive metallic substance, or an insulating polymeric composition.

3. An imaging member in accordance with claim 1 wherein the supporting substrate is aluminum.

4. An imaging member in accordance with claim 1 wherein the supporting substrate is overcoated with a polymeric adhesive layer.

5. An imaging member in accordance with claim 4 wherein the adhesive layer is a polyester resin.

6. An imaging member in accordance with claim 1 wherein the solution contains an amorphous selenium compound.

7. An imaging member in accordance with claim 1 wherein the solution contains an amorphous selenium arsenic alloy composition in an amine solvent.

8. An imaging member in accordance with claim 1 wherein the solvent is ethylene diamine.

9. An imaging member in accordance with claim 1 wherein the deposition is accomplished by spin casting.

10. An imaging member in accordance with claim 9 wherein subsequent to casting, the film resulting is heated at elevated temperatures.

11. An imaging member in accordance with claim 1 wherein the hole transport layer comprises substances selected from the group consisting of aryl amines, and polysilylenes.

12. An imaging member in accordance with claim 11 wherein the aryl amine is N,N'-diphenyl-N,N'-bis(3-methylphenyl)-[1,1'-biphenyl]-4,4'-diamine.

13. An imaging member in accordance with claim 1 wherein the resinous binder is a polycarbonate or polyvinyl carbazole.

14. An imaging member in accordance with claim 1 wherein there is selected a resinous binder for the photoconductive component selected from the group consisting of a polyester, polyvinyl carbazole, polyvinyl butyral, a polycarbonate, and a phenoxy resin; and the resinous binder for the aryl amine hole transport material is a polycarbonate, a polyester, or a vinyl polymer.

15. An imaging member in accordance with claim 1 wherein the aryl amine hole transport layer is situated between the supporting substrate and the photogenerating layer.

16. A method of imaging which comprises forming an electrostatic latent image on the imaging member of claim 1; affecting development thereof with toner particles; subsequently transferring the developed image to a suitable substrate; and permanently affixing the image thereto.

17. A method of imaging which comprises forming an electrostatic latent image on the imaging member of claim 2; affecting development thereof with toner particles; subsequently transferring the developed image to a suitable substrate; and permanently affixing the image thereto.

18. A method of imaging which comprises forming an electrostatic latent image on the imaging member of claim 3; affecting development thereof with toner particles; subsequently tranferring the developed image to a suitable substrate; and permanently affixing the image thereto.

19. A method of imaging which comprises forming an electrostatic latent image on the imaging member of claim 4; affecting development thereof with toner particles; subsequently transferring the developed image to a suitable substrate; and permanently affixing the image thereto.

20. An imaging member in accordance with claim 11 wherein the polysilylene is poly(methylphenylsilylene).

21. An imaging member in accordance with claim 1 wherein the alloy is selected from the group consisting of selenium tellurium, selenium arsenic, and selenium tellurium arsenic.

22. A process for the formation of an amorphous photoconductive component which comprises dissolving an inorganic photoconductive component selected from the group consisting of amorphous selenium and amorphous selenium alloys in a solvent consisting of one or more amines; thereafter removing the suspended particles therefrom; depositing the resulting solution on a supporting substrate; and subsequently heating the aforementioned formed device thereby enabling removal of the solvent.

23. A process in accordance with claim 22 wherein the dissolving is affected at a temperature of from about 50° to about 80° C.

24. A process in accordance with claim 22 wherein the solvent is ethylenediamine.

25. A process in accordance with claim 22 wherein the solvent is a mixture of ethylenediamine and butylamine.

26. A process in accordance with claim 22 wherein the supporting substrate is comprised of aluminum.

27. A process in accordance with claim 22 wherein the formed device is heated at a temperature of from about 60° to about 120° C.

28. A process in accordance with claim 22 wherein the solvent is an aliphatic amine.

29. An imaging member in accordance with claim 1 wherein heating is accomplished at a temperature of from about 60° to about 120° C.

30. An imaging member in accordance with claim 1 wherein the inorganic photoconductive component consists essentially of amorphous selenium.

31. An imaging member in accordance with claim 1 wherein the inorganic photoconductive component consists essentially of an amorphous selenium/tellurium alloy.

32. An imaging member in accordance with claim 1 wherein the inorganic photoconductive component consists essentially of a halogen doped amorphous selenium.

33. An imaging member in accordance with claim 32 wherein the dopant is present in an amount of from about 1 to about 1,000 parts per million.

34. An imaging member in accordance with claim 1 wherein the inorganic photoconductive component consists essentially of a halogen doped amorphous selenium/tellurium alloy.

35. An imaging member in accordance with claim 34 wherein the dopant is present in an amount of from about 1 to about 1,000 parts per million.

36. An imaging member in accordance with claim 1 wherein dissolving is accomplished at a temperature of from about 50 to about 80° C.

* * * * *